United States Patent [19]

Rourke

[11] Patent Number: 4,970,554
[45] Date of Patent: Nov. 13, 1990

[54] JOB PROCESSING SYSTEM FOR HIGH SPEED ELECTRONIC COPYING/PRINTING MACHINES

[75] Inventor: John L. Rourke, Fairport, N.Y.

[73] Assignee: Xerox Corporation, Stamford, Conn.

[21] Appl. No.: 407,499

[22] Filed: Sep. 14, 1989

Related U.S. Application Data

[63] Continuation of Ser. No. 261,806, Oct. 24, 1988, abandoned.

[51] Int. Cl.⁵ .............................................. G03G 15/00
[52] U.S. Cl. .................................... 355/202; 355/210; 355/200; 355/77; 101/DIG. 37
[58] Field of Search ................. 355/202, 210, 77, 200; 430/31; 101/DIG. 37; 346/160

[56] References Cited

U.S. PATENT DOCUMENTS

| | | | |
|---|---|---|---|
| 4,173,408 | 11/1979 | Stewart | 355/133 X |
| 4,248,528 | 2/1981 | Sahay | 355/14 R |
| 4,494,862 | 1/1985 | Tanaka | 355/244 X |
| 4,716,438 | 12/1987 | Farrell | 355/6 |
| 4,757,348 | 7/1988 | Rourke et al. | 355/6 |

*Primary Examiner*—R. L. Moses
*Attorney, Agent, or Firm*—Frederick E. McMullen

[57] ABSTRACT

A job processing site having plural electronic printers and document scanners, a job input station with electronic job ticket for entering printing instructions for a job with a job number to a job program file, a copier to provide a hard copy of the electronic job ticket with job number in machine readable form for assembly with the documents that comprise the job so that when the job is processed at the job site, the job number is obtained to retrieve the printing instructions for the job from the job program file.

13 Claims, 5 Drawing Sheets

JOB PROCESSING SYSTEM FOR HIGH SPEED ELECTRONIC COPYING/PRINTING MACHINES

This is a continuation of application Ser. No. 261,806, filed Oct. 24, 1988, now abandoned.

The invention relates to a job processing system, and more particularly, to a job processing system with one or more high speed electronic copying/printing machines in which job tickets are employed to control and enhance copying/printing operations.

High speed electronic copying and printing machines convert original images into image signals or pixels, and in that form process the image signals to provide the desired output which typically is in the form of copies or prints. Machines of this type naturally are and indeed expected to be highly automated to speed up job production and reduce operator time and involvement to the barest minimum.

Because of their high capacity, speed, and versatility, these machines are particularly suitable for use in central facilities or sites such as commercial printing establishments, in-plant copying and printing departments, etc. These applications typically queue jobs through all stages of the work process and utilize tools such as 'job tickets' to direct the work flow. These 'tickets' provide the direction to operators of the equipment to act on the hard documents being readied for production, the instructions serving as programming parameters to transform the original concepts (galleys/graphics/pictures, etc.) from separate entities and crude beginnings into integrated structures that are then ready for printing onto hard paper, etc.

To allow the operator to efficiently manage jobs by performing tasks in efficient clumps, it is desirable to program ahead several jobs at once. That is, the operator/shop will try and queue operations so that incoming jobs will be stacked prior to programming following which the individual stacks are programmed. Once the jobs are programmed, the operator can then place the job in the input hopper for processing.

In the prior art, U.S. Pat. Nos. 4,716,438 to Farrell and 4,757,348 to Rourke et al disclose the use of job and page separators to program high speed copying and printing machines in which the separators, which are designed to be added to and scanned with the document originals being processed, bear job programming information in the form of a bar code. The job and page separators are scanned by the machine document scanner, distinguished from the document originals and the bar code read to provide control instructions for operating the machine.

The use of control sheets inserted at selected points in the document stack to segregate and distinguish different jobs from one another is also suggested by U.S. Pat. No. 4,248,528 to Sahay et al. In that prior art patent, however, a separate reader is employed to read and decipher the control data on the control sheet, adding to the complexity and expense of the machine. There, the reader must be positioned at a point above the document stack in order to view the separator sheets, a position which can interfere with access to the document supply tray and which in some cases can limit the maximum number of documents that can be placed in the document supply tray.

In contrast to the prior art, the present invention provides an improved method for processing document printing jobs comprising the steps of: at a first location, preparing job tickets with printing instructions for a job program in machine readable form, the job tickets including a job number for each of the job programs; electronically storing the job tickets with the job programs and the job numbers in a job program file; producing a hard copy of the job tickets with the job numbers encoded thereon in machine readable form; combining the job ticket copies with the documents that comprise the job program associated with each of the job tickets; at a second location, scanning the job tickets and the document originals associated therewith to identify the job numbers and provide pixel representations of the documents associated with each of the job tickets; using the job numbers, retrieving the job programs for each of the printing jobs from the job program file; and electronically producing prints of the documents in accordance with the job programs retrieved.

Figure 1A:
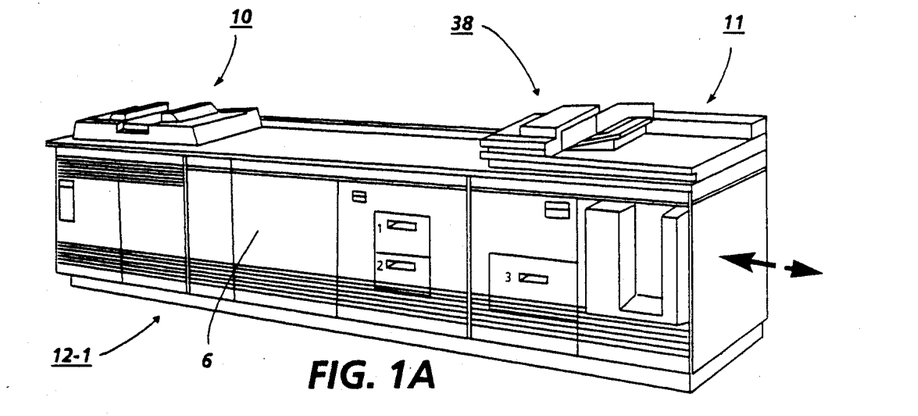
FIGS. 1A, 1B and 1C comprise a view depicting a central printing facility with printing machines of the type adapted to utilize the job processing system of the present invention.
Figure 1B:
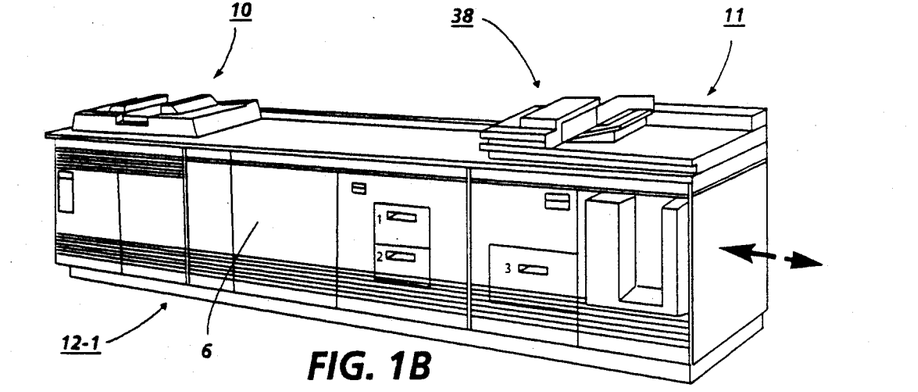
Figure 1C:
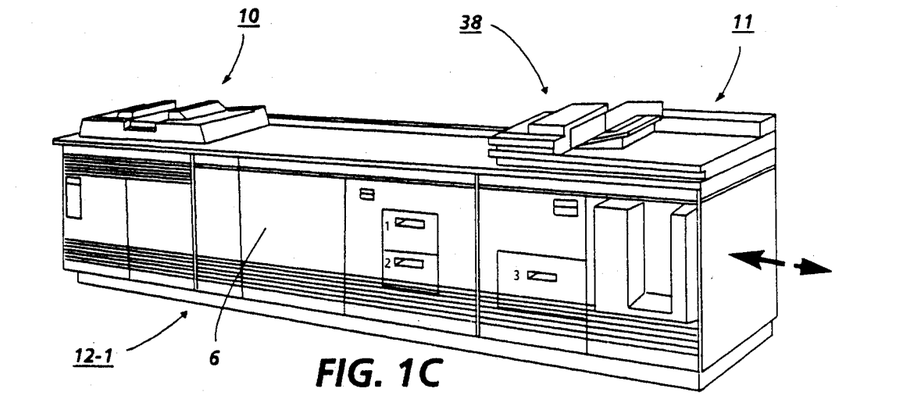

Referring to FIG. 1, there is shown a central printing facility or job printing site with a plurality of high speed electronic printers 12-1, 12-2, . . . 12-n for processing print jobs in accordance with the teachings of the present invention. Printers 12-1, 12-2, . . . 12-n may be assembled together in a single location such as a room or building to form a closed central production domain or may instead be scattered about within a facility such as an office building or manufacturing hub with individual printers located at various places on a floor and/or on different floors.

Referring now to FIGS. 1A, 1B, 1C, and 2, machines 12 are xerographic based printers having a xerographic section 6, document input scanner 7, raster output scanner 8, controller 9, automatic document handler 10, and copy output section 11. While xerographic based printers are described, it will be understood that xerographic type copiers may instead by used. Further, copiers and printers other than xerographic may instead be envisioned.

Figure 2:
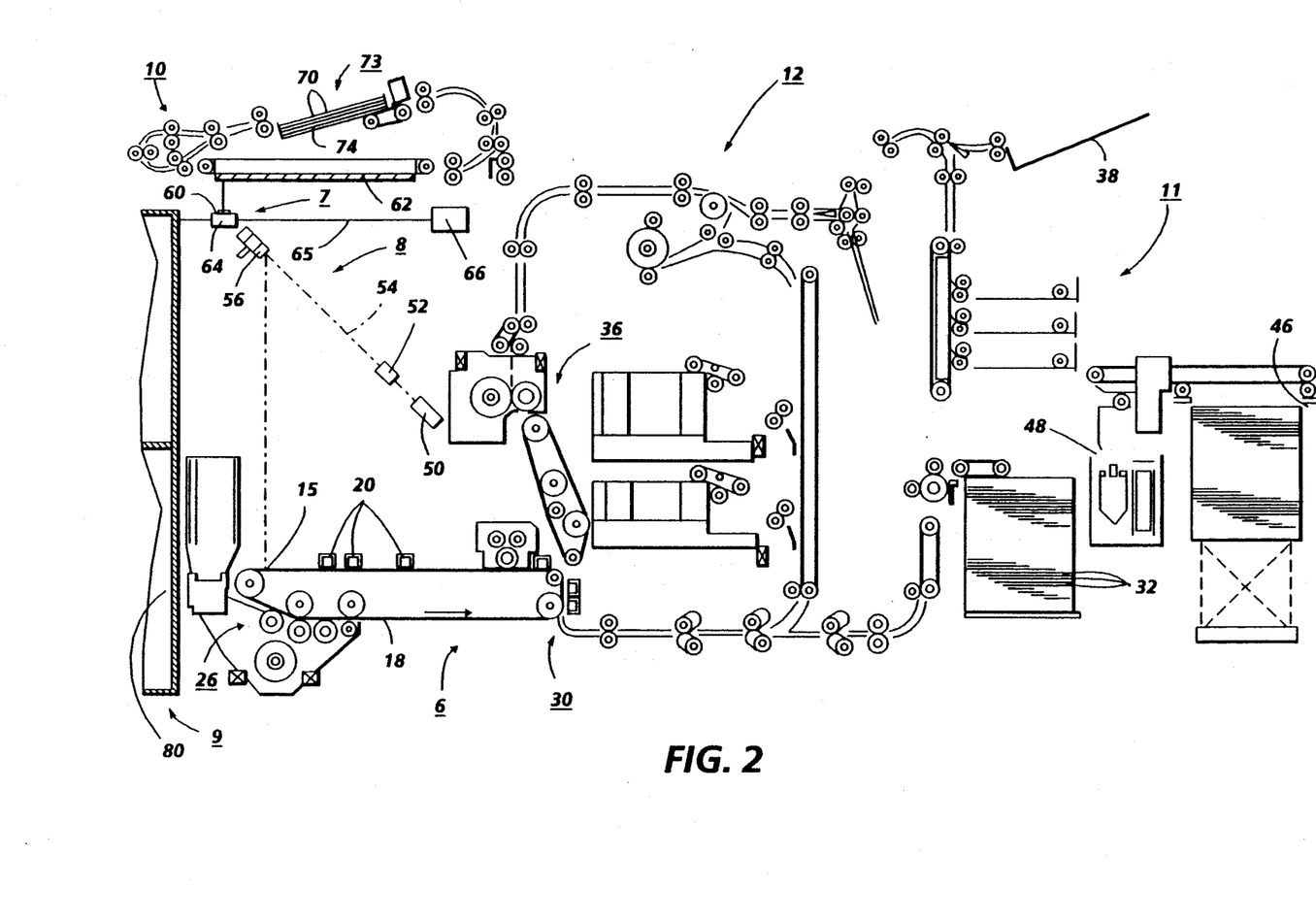
FIG. 2 is a plan view illustrating the principal operating components of the printing machines shown in FIGS. 1A, 1B, and 1C.

Xerographic section 6 includes a moving photoreceptor 18 in the form of a belt on which latent electrostatic images of the image being printed are created through selective exposure at an exposure station 15, photoreceptor 18 being previously uniformly charged by corotrons 20 at a charging station. The latent electrostatic image is developed at developing station 26 and transferred at transfer station 30 to a sheet 32 of copy substrate material brought forward in timed registration therewith. The developed image on copy sheet 32 is permanently fixed or fused at fusing station 36 and discharged to output tray 38, or alternately stitched by stitcher 46 or bound by binder 48.

Output scanner 8 has a laser 50 modulated in accordance with the content of an image signal input by acousto-optic modulator 52 to provide imaging beam 54. Beam 54 is scanned across photoreceptor 18 at exposure station 15 by the mirrored facets of a rotating polygon 56 to imagewise expose photoreceptor 18 and create the latent electrostatic images represented by the image signal input to modulator 52.

Input scanner 7 has one or more linear scanning arrays 60 such as charge coupled devices (CCD) mounted below a transparent platen 62 on a reciprocating carriage 64. A carriage drive screw 65 driven by a reversible motor 66 moves carriage 64 in either a forward or reverse scanning direction. A suitable optical system (not shown) is provided to focus array 60 on a line-like segment of platen 62 and the document original 70 resting thereon. Array 60 provides image signals or pixels representative of the image scanned which, after suitable processing, are input to printer memory 80 where the signals are stored pending use. Memory 80, which is in the form of a hard disc, stores machine operating programs and job programs in addition to image signals.

Documents 70 to be printed are supplied in stacks or batches 73 to document tray 74 by the document handler 10 and fed one by one from tray 74 into registered position on platen 62 where the document image is scanned. Following scanning, the document originals are returned to tray 74.

Controller 9 has one or more microprocessors for operating the printers in response to the job programming instructions accompanying with each print job. The various operating components and sections of printers 12 are linked together internally with one another by suitable internal communication channels (not shown).

Figure 3:
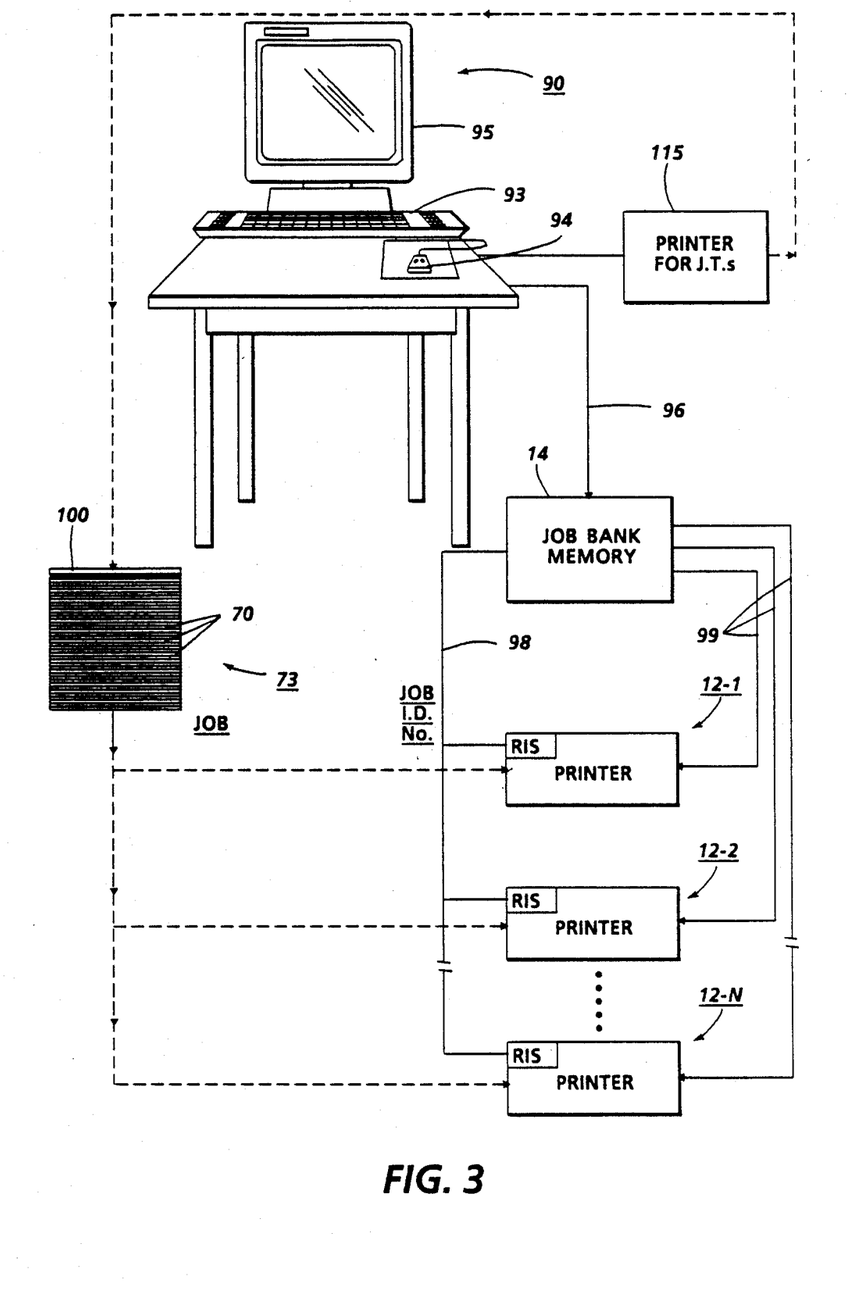
FIG. 3 is a block diagram illustrating the principal elements of the electronic job processing system of the present invention including job program input station, convenience copier or printer, job bank memory, and central printing facility.
Figure 4:
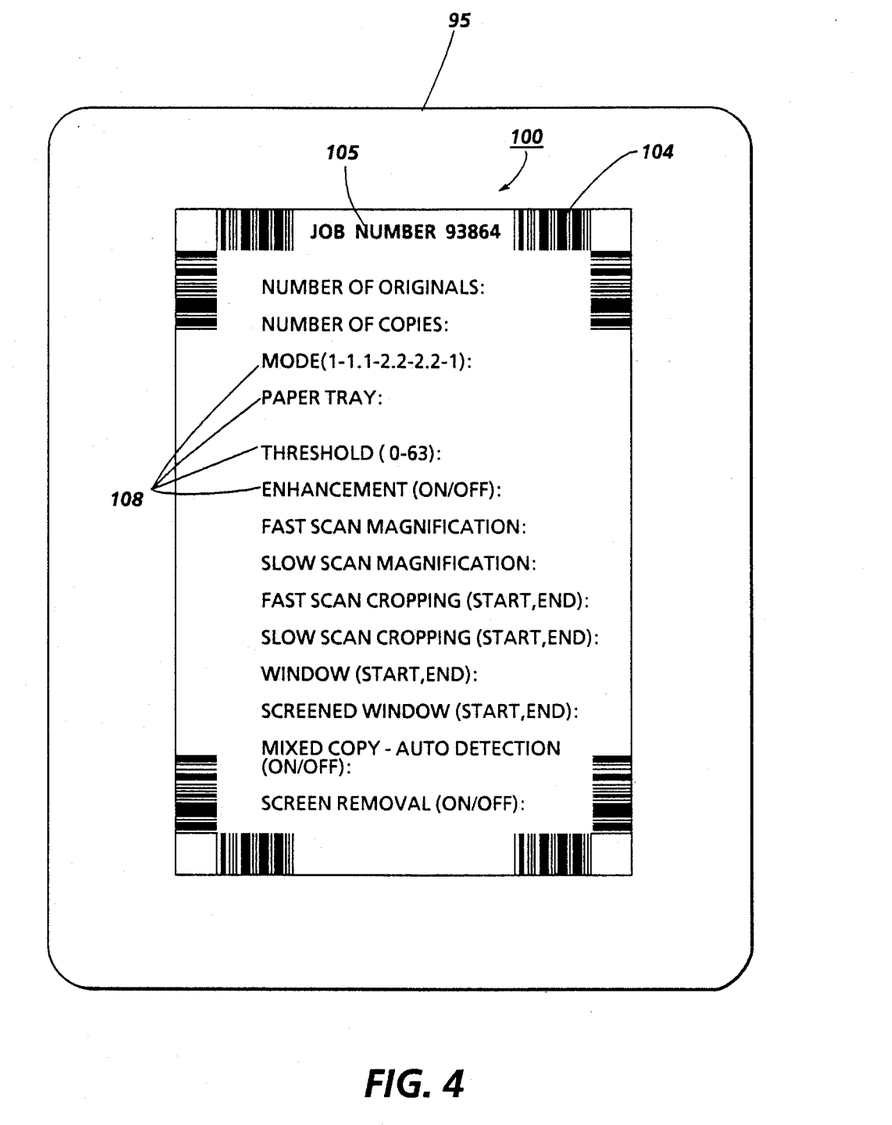
FIG. 4 is a view showing an exemplary job ticket displayed on the CRT screen at the job program input station.
Figure 5:
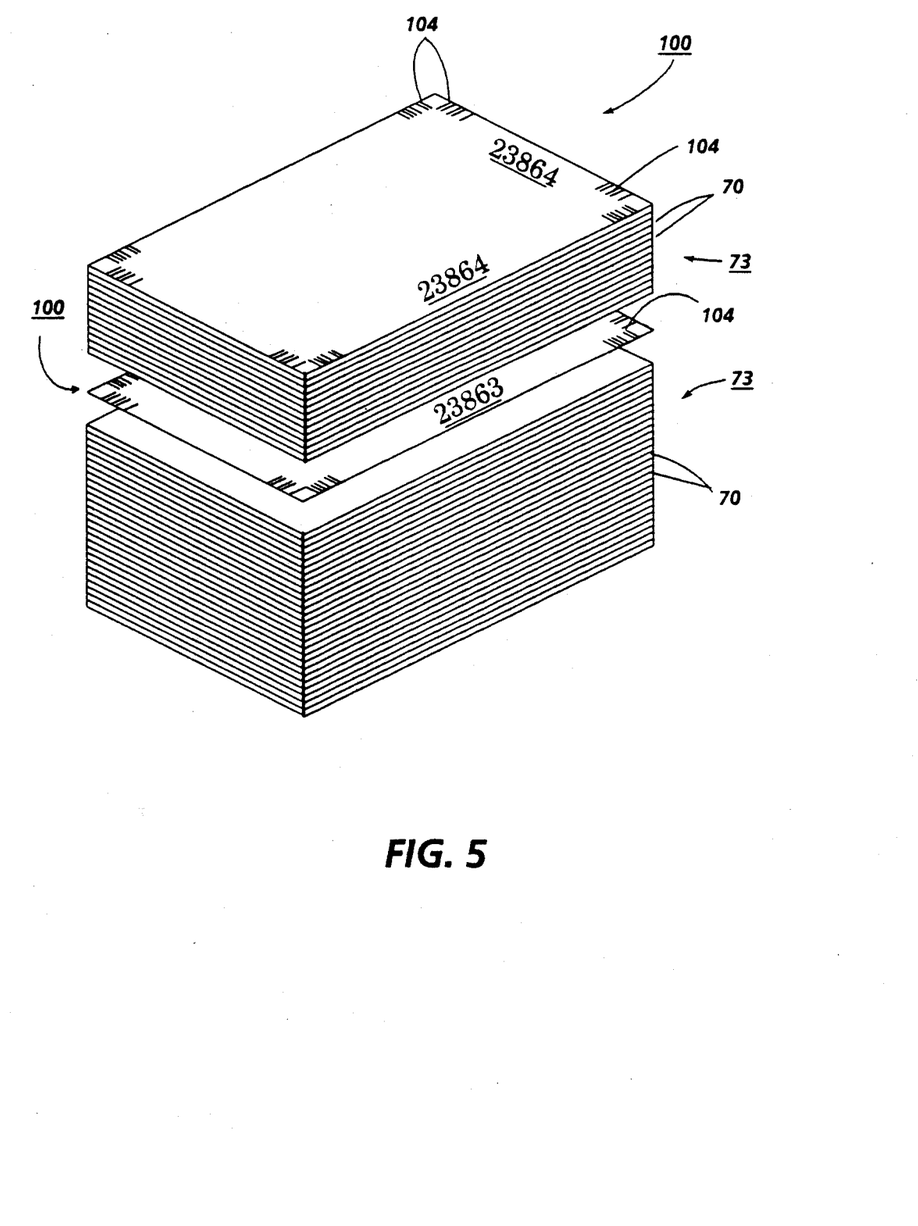
FIG. 5 is an isometric view showing stacks of document originals arranged for printing, each with a job ticket such as shown in FIG. 3 assembled with each stack.

Referring now to FIGS. 3-5, the electronic job processing system of the present invention includes one or more input stations 90 where print jobs are delivered by customers and users of the system. Each print job to be processed typically comprises a stack 73 of documents 70 which may be as small as one or two documents and as large as hundreds of documents 70 together with the job program desired. The job program normally includes number of prints to be made, and various other features such as type and color of paper, whether simplex or duplex prints are desired, etc. As will be understood, the job programs are limited by the ability of printers 12-1, 12-2, ... 12-n to comply with the instructions.

Input station 90 has a suitable job programming device shown here as a keyboard 93, mouse 94, and CRT display screen 95 for entering job programs into an electronic job program file. As the job printing selections are entered using keyboard 93 and mouse 94, the selections are displayed on screen 95. When completed, the electronic job program file is input to main job bank or memory 14, memory 14 being electronically coupled to input station 90 by suitable means such as bus 96. Input station 90 may be such as to allow the job owner or customer to program the job instructions himself or the particular job processing facility may employ a specialist, i.e., a job supervisor, for this purpose.

Memory 14 stores an electronic copy of a job ticket 100, with the various job processing options which printers 12-1, 12-2, ... 12-n of the printing facility are capable of carrying out. When a job program is to be entered at input station 90, a blank job ticket is called up and displayed on screen 95. Using keyboard 93 and mouse 94 in a conventional manner, the desired job options shown on the job ticket displayed on screen 95 are electronically filled in, either by the job supervisor from instructions provided by the customer or by the customer himself. A job identification number 105 for the particular job is also entered and coded at 104.

Once the job program is completed, a hard copy of the completed job ticket 100 bearing the job identification number is printed out for assembly with the batch 73 of documents 70 that comprise the job while the electronic job ticket having the job program is sent to the job program file in memory 14 for retention pending completion of the job. Job tickets 100 may be conveniently printed by a small convenience copier or printer 115 at input station 90. As a result, for each job there is provided a batch 73 of documents 70 to be printed, a numbered job program in memory 14 having printing instructions for the job, and a copy of the job ticket 100 bearing the job identification number 105 of the job in coded format for assembly with the batch of documents.

It will be understood that instead of printing a full copy of the job ticket showing the various job program selections made, a copy of a blank job ticket having only the job identification number in coded form may instead be printed out.

Following completion of the job programming phase, each batch of documents with its associated job ticket 100 is physically transferred to the job printing site which as discussed may be a printer in a central production domain or an individual printer located at some point in the facility. The document batch with job ticket 100 in place is loaded into the document tray 74 of the automatic document handler 10 of the printer 12-1, 12-2, ..., or 12-n selected to process the job. During printing, the job ticket 100 accompanying the batch of documents 70 is scanned by array 60 of input scanner 7 along with the documents 70 and the job identification number 105 obtained. Using the job identification number, the job program stored in memory 14 for that job number is addressed via bus 98 and transmitted via bus 99 to the printer originating the request, that is, the printer selected to carry out the job. The job printing instructions obtained program the printer which in turn processes the documents 70 and prints the job.

On completion of the job, the job program is cleared from memory 14 in order to make room for future job programs. The job programs for frequently used jobs may however be stored in memory 14 on a permanent or semi-permanent basis to avoid the need to re-program each time the same job is requested. In that event, a supply of job tickets 100 bearing the job identification numbers for the stored job programs may be printed out beforehand. When a job matching one of the job programs stored in memory 14 is received, the job ticket 100 having the job identification number for that specific job program is selected from the supply of job tickets and assembled with the batch of documents that comprise the job. On delivery of the documents with job ticket to the printer selected, the job identification number of the job ticket accesses the stored job program in memory 14 to program the printer and carry out the job in the manner described previously.

The job parameters available in the job program files stored in memory 14 are preferably displayed on the face of the pre-printed job tickets to facilitate job program selection and enable the particular job parameters associated with each numbered job ticket to be identified.

Job tickets 100 could also provide check-off boxes or the like to enable the customer to check off the job parameters desired. These could also be later used as a check to determine if the finished print job complied with the customer's instructions.

Input stations 90 may be located at some or all of the job customers, allowing the customers to enter the job program and obtain a printout of the job ticket from the customer's own site or office. In that event, the customer would create the job program file with the job program and job identification number, provide a copy of the job ticket, and deliver the stack of documents together with the job ticket to the job printing site. For job program files stored permanently in memory 14, the customer would provide the job ticket with the appropriate job identification number.

While the invention has been described with reference to the structure disclosed, it is not confined to the details set forth, but is intended to cover such modifications or changes as may come within the scope of the following claims.

I claim:

1. An improved method for processing document printing jobs comprising the steps of:
   (a) at a first location, preparing an electronic job ticket with printing instructions for a document printing job, said job ticket including a job number;
   (b) entering said electronic job ticket into a job program file;
   (c) producing a hard copy of said electronic job ticket with said job number encoded thereon in machine readable form;
   (d) combining said job ticket hard copy with the documents that comprise said document printing job;
   (e) at a second location, scanning said job ticket hard copy and the document originals associated therewith to identify said job number and provide pixel representations of the documents associated with said job ticket hard copy;
   (f) using said job number, retrieving said electronic job ticket with said printing instructions for said document printing job from said job program file; and
   (g) producing prints of the documents that comprise said job program in accordance with the printing instructions from said retrieved electronic job ticket.

2. The method according to claim 1 including the steps of:
   (a) storing predetermined ones of said electronic job tickets with the program job numbers therefor in said job program file;
   (b) providing hard copies of said electronic job tickets stored in said job program file;
   (c) on receipt of a document printing job having the same printing instructions as one of said electronic job tickets stored in said job program file, selecting the job ticket hard copy with the program job number matching said one electronic job ticket;
   (d) associating said selected job ticket hard copy with the documents that comprise said document printing job;
   (e) at said second location, scanning said selected job ticket hard copy and the document originals associated therewith to identify said job number and provide pixel representations of the documents associated with said job ticket hard copy;
   (f) using said job number, retrieving said one electronic job ticket with said printing instructions for said document printing job from said job program file; and
   (g) producing prints of the documents that comprise said document printing job in accordance with the printing instructions from said one electronic job ticket.

3. The method according to claim 1 including the steps of:
   (a) providing a plurality of electronic printing devices at said second location, each of said printing devices having a document scanner for scanning documents and said job ticket hard copy to electronically identify the job number on said job ticket hard copy and provide pixel representations of the documents associated with said job ticket hard copy;
   (b) providing each of said printing devices with access to said job program file; and
   (c) placing said document printing job in a selected one of said document scanners for processing of the documents associated with said job ticket hard copy in accordance with the printing instructions from the electronic job ticket corresponding to said job ticket hard copy.

4. An improved method for processing document printing jobs comprising the steps of:
   (a) at a first location, preparing an electronic job ticket with printing instructions for a document printing job, said job ticket including a job number;
   (b) retaining said electronic job ticket;
   (c) producing a hard copy of said job ticket with said job number encoded thereon in machine readable form;
   (d) combining said job ticket hard copy with the documents that comprise said document printing job;
   (e) at a second location, scanning said job ticket hard copy and the document originals associated therewith to identify said job number and provide pixel representations of the documents that comprise said document printing job;
   (f) using said job number, accessing said electronic job ticket for said document printing job; and
   (g) producing prints of said documents in accordance with the printing instructions from said electronic job ticket.

5. The method according to claim 4 including the steps of:
   (a) storing predetermined ones of said electronic job tickets;
   (b) providing at least one hard copy of said stored electronic job tickets;
   (c) on receipt of a document printing job for printing in accordance with the printing instructions of one of said stored electronic job tickets, selecting the job ticket hard copy corresponding to said one electronic job ticket;
   (d) associating said selected job ticket hard copy with the documents that comprise said document printing job;

(e) at said second location, scanning said selected job ticket hard copy and the document originals associated therewith to electronically identify said job number and provide pixel representations of the documents that comprise said document printing job;

(f) using said job number, accessing said one electronic job ticket; and (g) producing prints of said documents in accordance with printing instructions from said one electronic job ticket.

6. The method according to claim 4 including the steps:

(a) providing a plurality of electronic printing devices at said second location, each of said printing devices having a document scanner for scanning documents and said job ticket hard copies to provide pixel representations of the documents and electronically identify the job numbers on said job ticket hard copies;

(b) providing each of said printing devices with access to said electronic job tickets; and (c) placing said document printing job in a selected one of said document scanners for printing of the documents in accordance with the printing instructions from said electronic job ticket.

7. An improved method for processing document printing jobs comprising the steps of:

(a) at a first location, entering job printing instructions and job identifying numbers for each of said printing jobs in an electronic job program file to provide an electronic job ticket for each printing job;

(b) from said job program file, producing a hard copy of a job ticket for each of said printing jobs, each of said job tickets hard copies having the job number encoded thereon in machine readable form;

(c) combining each of said job ticket hard copies with the documents that comprise the printing job represented by the job number on the job ticket hard copy;

(d) at a second location, scanning said job ticket hard copy and the document originals associated therewith to identify said job number and provide image signals representative of the documents scanned;

(e) with said job number, accessing said job program file to obtain the corresponding one of said electronic job tickets; and (f) electronically producing prints of said documents from said image signals in accordance with the job printing instructions from said electronic job tickets.

8. The method according to claim 7 including the steps of:

(a) permanently retaining predetermined ones of said electronic job tickets;

(b) providing job ticket hard copies with program job numbers for each of said electronic job tickets;

(c) for printing jobs where the printing instructions are the same as the printing instructions in preset ones of said retained electronic job tickets, selecting the job ticket hard copies having the same program job numbers;

(d) combining said selected job ticket hard copies with the documents that comprise said printing jobs;

(e) at said second location, scanning said job tickets and the document originals associated therewith to identify the job numbers for each of said printing jobs and provide image signals representative of the documents scanned;

(f) using said job number, accessing said preset ones of said retained electronic job tickets to obtain the job printing instructions for said printing jobs; and (g) producing prints of said documents from said image signals in accordance with job printing instructions from said preset ones of said electronic job tickets.

9. An improved method for processing document printing jobs comprising the steps of:

(a) at a first location, preparing printing instructions for carrying out each job together with a job identification number;

(b) electronically storing said printing instructions together with the job identification number therefor in a job program file;

(c) from said printing instructions, producing a job ticket for each of said jobs, each job ticket having the job identification number for one of said jobs encoded thereon in machine readable form;

(d) combining said job tickets with the documents for the job represented by the job identification number to provide stacks of documents with associated job tickets;

(e) at a second location, scanning said job tickets and the document originals associated therewith to identify said job numbers and provide pixel representations of the documents for printing;

(f) using said job numbers, retrieving the printing instructions for each of said jobs from said job program file; and (g) programming said printing apparatus with the printing instructions retrieved from said job program file whereby to produce prints of said documents in accordance with the job programs retrieved.

10. An improved method for processing document printing jobs using a central facility with plural electronic printing machines with document scanners for making prints from image signals, a memory for storing completed job program files ready for printing, said memory providing an blank job ticket identifying the printing process capabilities of said facility for use when programming jobs, comprising the steps of:

(a) at a separate location, accessing said memory to electronically display said blank job ticket;

(b) using said blank job ticket, programming a job by electronically selecting desired ones of the printing process capabilities identified on said job ticket to provide an electronic job program file for said job;

(c) inputting a job identifying number for said job program file;

(d) producing a hard copy of said job ticket having at least said job identifying number thereon in machine readable form;

(e) combining said job ticket with the documents that comprise said job;

(f) at said central facility, loading said documents with said job ticket into the document scanner of a selected one of said printing machines so that said job ticket and the document originals associated therewith are scanned and said job number identified and image signal representative of the documents scanned provided;

(g) using said job number, accessing said job program file in said memory to obtain said job printing instructions; and (h) electronically producing prints of said documents from said image signals in accordance with said job printing instructions.

11. A method for processing document printing jobs comprising the steps of:

(a) at plural customer input stations, preparing electronic job tickets with printing instructions for individual document printing jobs, each of said job tickets including an identifying job number;

(b) entering the electronic job tickets prepared in step a into a central job program file;

(c) producing hard copies of the electronic job tickets prepared in step a at said customer input stations with the job identifying number for each job ticket encoded thereon in machine readable form;

(d) at said customer input stations, combining said job ticket hard copies produced in step c with the documents that comprise the document printing job represented by the job identifying number on the job ticket to provide said document printing jobs;

(e) delivering said document printing jobs from step d to a central printing facility;

(f) at said central printing facility, scanning said document printing jobs to obtain the job number for the jobs from said job ticket hard copies and provide pixel representations of the documents;

(f) using the job numbers obtained in step e, retrieving the electronic job ticket with the printing instructions for each of said document printing jobs from said central job program file; and (h) producing prints of the documents that comprise said document printing jobs in accordance with the printing instructions retrieved from said central job program file.

12. The method according to claim 11 including the steps of:

(a) at said central printing facility, providing a plurality of electronic printers, each of said printers having a document scanner for scanning said document printing jobs to electronically obtain said job numbers and provide said pixel representations of the documents;

(b) providing each of said printers with access to said central job program file; and (c) placing said document printing jobs from said customer input stations in selected ones of said document scanners to print said documents in accordance with the printing instructions accessed from said central job program file.

13. The method according to claim 11 including the steps of:

(a) saving predetermined ones of said job tickets in said central job program file;

(b) providing job ticket hard copies of said electronic job tickets saved in said central job programming file for use at said customer input stations;

(c) on receipt of a document printing job at one of said customer input stations having the same printing instructions as one of said electronic job tickets saved in said job program file, selecting the job ticket hard copy with the identifying job number for said one electronic job ticket; and (d) combining said selected job ticket hard copy with the documents that comprise said document printing job for processing in accordance with said electronic job ticket printing instructions at said central printing facility.

* * * * *